United States Patent
Yamato (10) Patent No.: US 12,116,114 B2
(45) Date of Patent: Oct. 15, 2024

(54) UNMANNED AERIAL VEHICLE

(71) Applicant: RAKUTEN GROUP, INC., Tokyo (JP)

(72) Inventor: Takumi Yamato, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 546 days.

(21) Appl. No.: 16/972,611

(22) PCT Filed: Nov. 9, 2018

(86) PCT No.: PCT/JP2018/041651
§ 371 (c)(1),
(2) Date: Dec. 7, 2020

(87) PCT Pub. No.: WO2020/095435
PCT Pub. Date: May 14, 2020

(65) Prior Publication Data
US 2021/0237868 A1    Aug. 5, 2021

(51) Int. Cl.
*B64C 25/54* (2006.01)
*B60L 15/20* (2006.01)
(Continued)

(52) U.S. Cl.
CPC .............. *B64C 25/54* (2013.01); *B60L 15/20* (2013.01); *B60L 50/60* (2019.02); *B64C 39/024* (2013.01); *B64D 9/003* (2013.01); *B64D 17/80* (2013.01); *B64D 27/24* (2013.01); *B60L 2200/10* (2013.01); *B64U 10/13* (2023.01);
(Continued)

(58) Field of Classification Search
CPC ...... B64C 25/54; B64U 10/13; B64U 2101/60
See application file for complete search history.

(56) References Cited

U.S. PATENT DOCUMENTS 9,365,088 B2 * 6/2016 Belik ................... B64C 25/52
9,457,900 B1 * 10/2016 Jones ................... B64C 39/024
(Continued)

FOREIGN PATENT DOCUMENTS

CN      106945827 A    7/2017
JP      2008528947 A   7/2008
(Continued)

OTHER PUBLICATIONS

Matt Burns: "Strap a parachute onto your drone with the ParaZero SafeAir TechCrunch", Mar. 27, 2016 (Mar. 27, 2016), pp. 1-3.
(Continued)

*Primary Examiner* — Michael H Wang
(74) *Attorney, Agent, or Firm* — HEA Law PLLC (57) ABSTRACT

An unmanned aerial vehicle (UAV) includes propellers, motors configured to drive the propellers, respectively, a main body including a control device configured to control the motors, and a wireless device configured to perform at least one of transmission or reception of a signal, a package container for containing a package, and at least one float. In a case where the UAV is placed on water, buoyancy of the float and the package container prevents a surface of the water from reaching at least a height of the wireless device. The buoyancy of the package container increases with the volume of the package container.

16 Claims, 9 Drawing Sheets

(51) Int. Cl.
  *B60L 50/60* (2019.01)
  *B64C 39/02* (2023.01)
  *B64D 9/00* (2006.01)
  *B64D 17/80* (2006.01)
  *B64D 27/24* (2006.01)
  *B64U 10/13* (2023.01)
  *B64U 30/20* (2023.01)
  *B64U 50/19* (2023.01)
  *B64U 101/60* (2023.01)

(52) U.S. Cl.
  CPC .............. *B64U 30/20* (2023.01); *B64U 50/19* (2023.01); *B64U 2101/60* (2023.01)

(56) References Cited

U.S. PATENT DOCUMENTS

| | | | |
|---|---|---|---|
| D795,785 S | 8/2017 | Morrison et al. | |
| 2010/0001902 A1 | 1/2010 | Smith | |
| 2014/0061376 A1 | 3/2014 | Fisher et al. | |
| 2015/0217862 A1* | 8/2015 | Dijaux | B64D 25/18 244/105 |
| 2016/0159468 A1 | 6/2016 | Harris, III et al. | |
| 2016/0176514 A1* | 6/2016 | Lavagen | B64C 37/00 244/50 |
| 2016/0200438 A1* | 7/2016 | Bokeno | B64F 1/362 244/2 |
| 2016/0221676 A1 | 8/2016 | Fisher et al. | |
| 2017/0129603 A1* | 5/2017 | Raptopoulos | G08G 5/0069 |
| 2017/0247110 A1* | 8/2017 | Chappell | B64C 27/52 |
| 2017/0253333 A1* | 9/2017 | Baudet | B64C 1/30 |
| 2017/0261998 A1* | 9/2017 | Wang | B64C 25/54 |
| 2017/0269609 A1* | 9/2017 | Bradlow | G05D 1/0669 |
| 2018/0002001 A1* | 1/2018 | Daniel, Sr. | B64C 27/08 |
| 2018/0057152 A1* | 3/2018 | Reichert | B64C 1/0009 |
| 2018/0065735 A1* | 3/2018 | Ichihara | B64C 25/32 |
| 2018/0208309 A1* | 7/2018 | Wang | B64C 25/56 |
| 2018/0305013 A1 | 10/2018 | Fisher et al. | |
| 2019/0016450 A1* | 1/2019 | Reichert | B64C 27/08 |
| 2019/0106211 A1* | 4/2019 | Longhi | B64C 1/061 |
| 2019/0176974 A1* | 6/2019 | Sugaki | B64C 39/024 |
| 2019/0233100 A1 | 8/2019 | Fisher et al. | |
| 2019/0250643 A1* | 8/2019 | Takizawa | B64C 39/024 |
| 2020/0010193 A1* | 1/2020 | Alexander | B64C 39/024 |
| 2020/0317338 A1 | 10/2020 | Wang | |
| 2021/0001700 A1 | 1/2021 | Fisher et al. | |
| 2021/0109551 A1 | 4/2021 | Takizawa | |

FOREIGN PATENT DOCUMENTS

| | | | |
|---|---|---|---|
| JP | 2013531573 A | 8/2013 | |
| JP | 2015117003 A | 6/2015 | |
| JP | 2016107984 A | 6/2016 | |
| JP | 2017071285 A | 4/2017 | |
| JP | 2017530043 A | 10/2017 | |
| WO | 2016148303 A1 | 9/2016 | |
| WO | 2017216972 A1 | 12/2017 | |
| WO | 2018042610 A1 | 3/2018 | |

OTHER PUBLICATIONS

Search Report of Jun. 4, 2021, for corresponding EP Patent Application No. 18939399.4, pp. 1-9.
Naval Architects Journal, May 1937, Abstract of "Short "Empire" flying boat", pp. 348-358 (See Partial translation of the Written Opposition).
The Journal of the Royal Aeronautical Society, Mar. 1933, Abstract of "Fluid Dynamics of Waterplane" pp. 466-473 (See Partial translation of the Written Opposition).
Jsass, vol. 31, No. 349, "Landing Approach on the Water by Automatic Thrust Control Apparatus of STOL Flying Boats" Feb. 1983, pp. 103-109 (See Partial translation of the Written Opposition).
Website page of the crowdfunding site "https://www.makuake.com/project/drone-float/" retrieved on Aug. 31, 2017, pp. 1-5 (See Partial translation of the Written Opposition).
Website page of the Dronerafts, "https://www.dronerafts.com/" retrieved on Nov. 7, 2016, pp. 1-3.
Written Opposition of Mar. 9, 2021, to corresponding JP Patent No. 6736794 with partial English translation pp. 1-400.
Office Action of Jul. 5, 2024, for corresponding CN Patent Application No. 201880095533.9 with partial English translation, pp. 1-5.
Zhu Shengyu, "Scale model of aircraft", Shanghai, Shanghai Educational Publishing House, Sep. 1980, p. 55 (For concise explanation of relevance, see partial translation of the Office Action).
Shaan Pinglei,"Traffic in all directions", Shanghai, Shanghai Scientific & Technological Literature Publishing House, Jan. 2011, p. 119 (For concise explanation of relevance, see partial translation of the Office Action).

* cited by examiner

UNMANNED AERIAL VEHICLE

CROSS REFERENCE TO RELATED APPLICATIONS

This application is a National Stage of International Application No. PCT/JP2018/041651 filed on Nov. 9, 2018. The contents of the above document is incorporated herein by reference in its entirety.

TECHNICAL FIELD

This disclosure relates to an unmanned aerial vehicle (UAV) for carrying a package.

BACKGROUND ART

In recent years, unmanned aerial vehicles (UVAs) called drones that can take off and land in the vertical direction has been used actively. One of the applications of UAVs is transport of packages. For example, using the UAVs for transporting packages to remote islands is being considered. When a UAV is used for such transportation, the UAV may land on the sea during flight. In order to prevent the UAV from submerging at the time of landing on the water, it is effective to provide a float on the UAV. References 1-2 (see below) disclose UAVs that are not for transporting packages but have a float.

CITATION LIST

Patent Literature

Patent Literature 1: WO2018/042610
Patent Literature 2: JP2015-117003A

SUMMARY OF INVENTION

A UAV that carries a package has a relatively large mass. As such, it is necessary to increase a size of a float in order to prevent the UAV from being submerged. However, if the size of the float is increased to obtain sufficient buoyancy, the float increases the air resistance during flight.

(1) A UAV proposed in this disclosure includes propellers, motors configured to drive the propellers respectively, a control device configured to control the motors, and a main body including a wireless device configured to perform at least one of transmission and reception of signals, a package container for storing a package, and at least one float. When the UAV is placed on water, buoyancy of the float and the package container prevents a surface of the water from reaching at least a height of the wireless device. The buoyancy of the package container depends on a volume of the package container.

According to this structure, it is possible to use the buoyancy of the package container in addition to the buoyancy of the float. This can serve to downsize the float. As a result, air resistance due to the float during flight can be reduced. Even when the UAV falls on the water surface, the wireless device can operate, and thus a user can reduce the risk of losing the UAV.

(2) When the UAV of (1) is placed on water in a state where the buoyancy of the float acts while the buoyancy of the package container does not act, the water surface may reach a height of at least one of the battery, the motor, or the main body. In other words, a small-sized float may be used so that the water surface may reach a height of at least one of these components. This serves to further reduce air resistance due to the float during flight.

(3) In the UAV of (1) or (2), the package container includes a bottom wall forming a bottom surface of the package container and other walls forming other surfaces than the bottom surface. At least the other walls may be liquid-tight. This allows the UAV to obtain the buoyancy of the package container when the UAV falls on the water surface.

(4) In the UAV of any one of (1) to (3), a position of at least a part of the float may be higher than a horizontal plane including the bottom surface of the package container. According to this arrangement, the height of the float becomes closer to the height of the center of gravity of the UAV, which serves to improve the stability of the attitude of the UAV.

(5) In the UAV of any one of (1) to (4), the float may intersect with a horizontal plane including a center of gravity of the UAV. According to this arrangement, the height of the float becomes closer to the height of the center of gravity of the UAV, which serves to improve the stability of the attitude of the UAV.

(6) In the UAV of any one of (1) to (5), the main body may be surrounded by the propellers in a plan view of the UAV, and the position of the float may be apart from the main body in a horizontal direction in a plan view of the UAV. This serves to improve the stability of the attitude of the UAV.

(7) In the UAV of any one of (1) to (5), a distance between a center of the UAV and the float in a plan view may be shorter than a distance between the center of the UAV and a center of the propellers in a plan view. According to this arrangement, it is possible to prevent the float from affecting the air flow formed by the rotation of the propellers.

(8) The UAV of any one of (1) to (7) may further include a support frame that is in contact with a land to support the UAV when the UAV lands. The float may be attached to the support frame. According to this arrangement, the float can be easily attached.

(9) In the UAV of (8), the float may be located at a lower end of the support frame. According to this arrangement, when the UAV lands, the float hits the ground, and can function as a cushioning material.

(10) In the UAV of (8), the float may be located at a position higher than the lower end of the support frame. According to this arrangement, when the UAV lands on the ground, a sufficient distance can be secured between the ground and the package container. Further, the position of the float can be closer to the height of the center of gravity of the UAV. As a result, the stability of the attitude of the UAV on the water can be improved.

(11) In the UAV of any one of (1) to (10), a size of each of the floats in a vertical direction may be smaller than a size of each of the floats in a front-rear direction and a size of each of the floats in a left-right direction. This serves to reduce air resistance due to the float during flight.

(12) The UAV of any one of (1) to (11) may include a deployable parachute. This serves to stabilize the attitude of the UAV when the UAV lands.

DESCRIPTION OF EMBODIMENTS

An embodiment of a UAV proposed in this disclosure will be described. As an example, a UAV 100 shown in the drawings such as FIG. 1 will be described herein.

Figure 1:
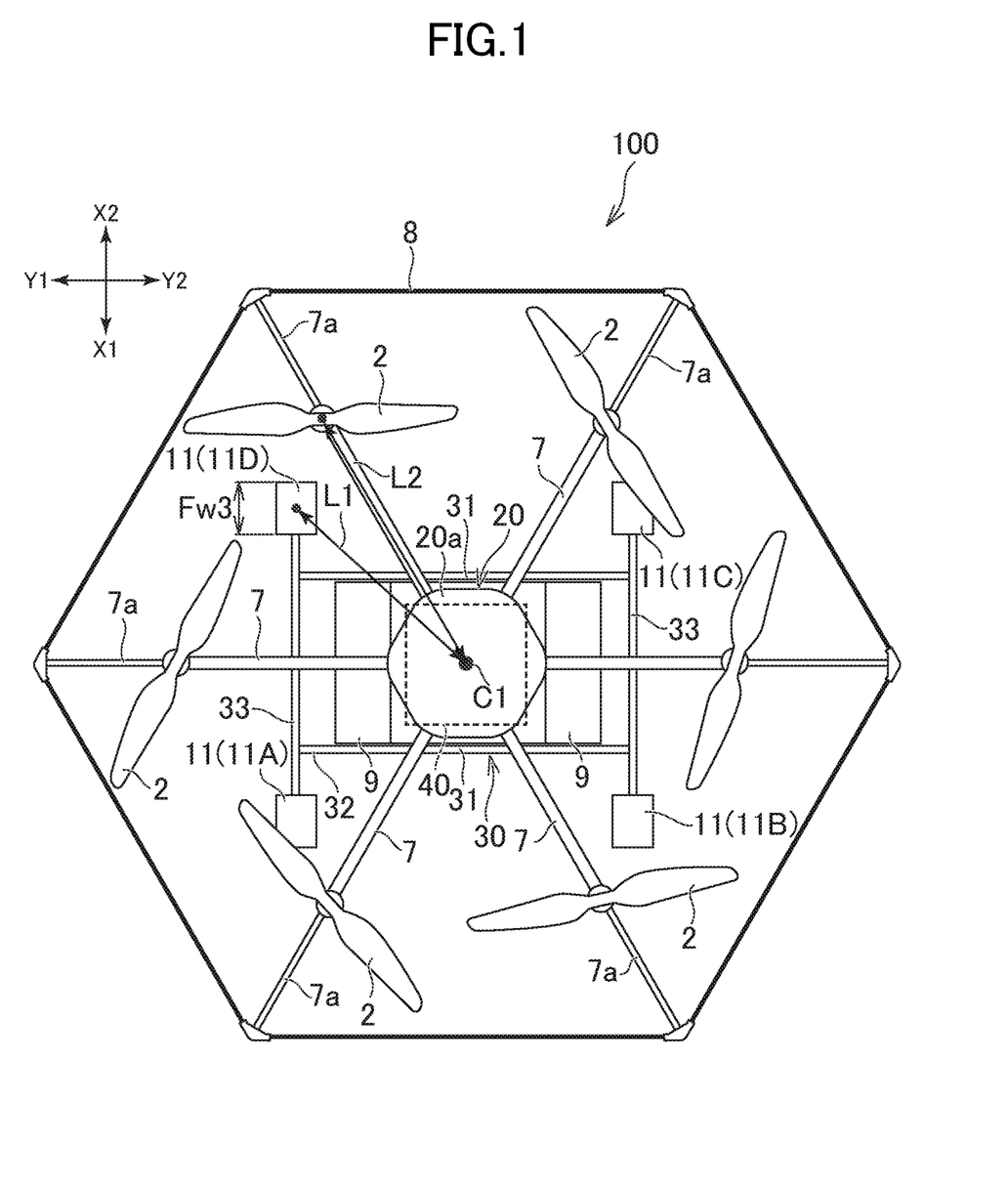
FIG. 1 is a plan view of an example of a UAV proposed in this disclosure.
Figure 2:
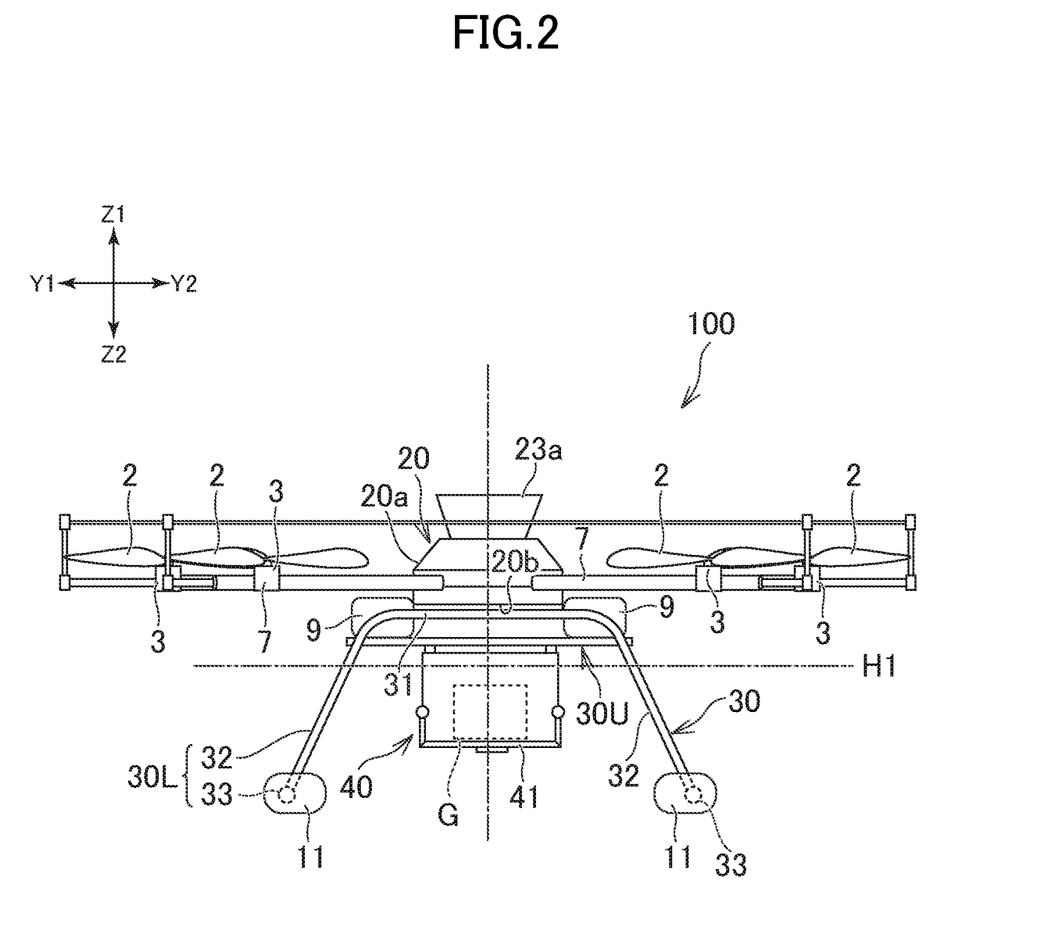
FIG. 2 is a side view of an example of the UAV shown in FIG. 1.

In the following, a Z1 direction and a Z2 direction shown in FIG. 2 are respectively referred to as upward and downward directions, and a Y1 direction and a Y2 direction shown in FIG. 2 are respectively referred to as forward and rearward directions. A X1 direction and a X2 direction shown in FIG. 1 are respectively referred to as rightward and leftward directions. A direction along the plane created by X1-X2 and Y1-Y2 is referred to as a horizontal direction.

[Overview]

The UAV 100 is a vehicle used for transporting packages (hereinafter, the UAV 100 is simply referred to as a UAV). For example, the UAV 100 transports various commodities such as daily necessities, foodstuffs, electronic devices, and books. The UAV 100 is used for transportation to a remote island over the sea, for example. The UAV 100 may be a device that is remotely controlled by a wireless method, or a device that autonomously flies after a target position (landing position) is specified.

The UAV 100 is a multicopter that can take off and land in a vertical direction. As shown in FIG. 1, the UAV 100 has propellers 2 and motors 3 (see FIG. 2) for respectively rotating the propellers 2. The UAV 100 has six propellers 2, although the number of the propellers 2 is not limited to six, and may be, for example, three to five, or seven or more. Further, the UAV 100 has the motor 3 directly below the center of the propeller 2, although the position of the motor 3 may not be directly below the propeller 2. The UAV 100 has a main body 20 at the center thereof. The propellers 2 and the motors 3 are arranged at equal intervals in the circumferential direction around the main body 20.

The UAV 100 has one or more batteries 9. In FIG. 1, the UAV 100 has two batteries 9. Although the UAV 100 has two batteries 9 in FIG. 1, the number of the batteries 9 may be one, or three or more. The motor 3 is driven by electric power supplied from the battery 9. The battery 9 is disposed at the center of the UAV 100. The battery 9 is supported by a support frame 30 disposed at the center of the UAV 100.

As shown in FIG. 1, the UAV 100 has support arms 7 extending horizontally from the main body 20. Each support arm 7 supports a motor 3 at a position away from the main body 20. Each support arm 7 may have an extension 7a further extending from the position of the motor 3. The extension 7a may support a guard cable 8 surrounding the entirety of the propellers 2 at its end.

[Main Body]

Figure 3:
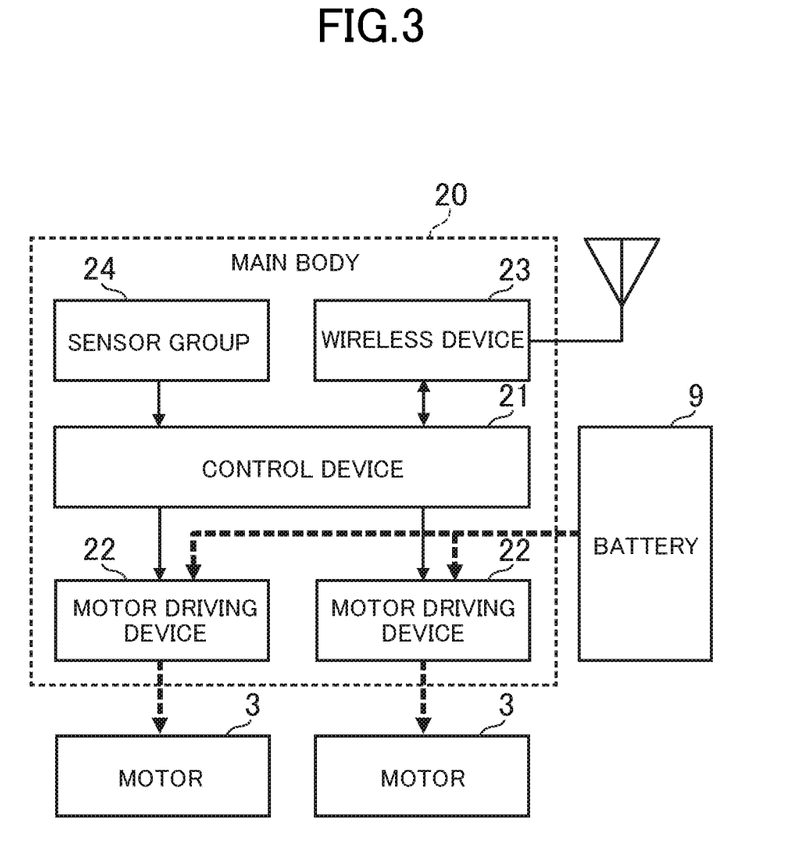
FIG. 3 is a block diagram showing a configuration of the UAV.

As shown in FIG. 3, the main body 20 includes a control device 21, a motor driving device 22, a wireless device 23, and a sensor group 24. The main body 20 has a housing 20a (see FIG. 2) for accommodating the control device 21 and the wireless device 23, for example. Further, the main body 20 may include a battery that stores power to be supplied to the control device 21 separately from the battery 9 for driving the motor 3.

The sensor group 24 includes, for example, a three-axis gyro sensor and a three-axis accelerometer. The three-axis gyro sensor outputs a signal corresponding to, for example, a pitch angle, a roll angle, and a yaw angle of the UAV 100. The three-axis accelerometer outputs signals corresponding to the acceleration of the UAV 100 in the front-rear direction, the acceleration in the left-right direction, and the acceleration in the vertical direction. The types of sensors included in the sensor group 24 are not limited to these examples. For example, the sensor group 24 may further include a geomagnetic sensor that outputs a signal corresponding to the orientation of the UAV 100.

The wireless device 23 performs at least one of transmitting and receiving signals. In this specification, the wireless device 23 means each of a receiver and a transmitter. The wireless device 23 includes, for example, a GPS (Global Positioning System) receiver. In addition, the wireless device 23 includes a beacon transmitter that emits a beacon, which is a signal including position information of the wireless device 23, for example. Further, the wireless device 23 may include a receiver that receives a command from an external operation input device (not shown) or a transmitter that transmits the state of the UAV 100 to the external operation input device. The external operation input device is, for example, a personal computer operated by a user of the UAV 100 (an operator who monitors flight) or a dedicated input device. The wireless device 23 outputs the content of the received signal to the control device 21 and transmits the signal acquired from the control device 21. The UAV 100 may include an antenna 23a connected to the wireless device 23. The antenna 23a is attached to, for example, an upper part of the main body 20 (see FIG. 2).

The motor driving device 22 receives power from the battery 9 and supplies the motor 3 with the power according to a command value received from the control device 21. The motor 3 rotates at a speed according to the power (voltage) supplied from the motor driving device 22. The UAV 100 has a motor driving device 22 for each of the motors 3. In FIG. 3, two motor driving devices 22 are shown as an example.

The control device 21 includes a storage device and a microprocessor that executes a program stored in the storage device. The control device 21 controls the motor 3 based on a signal (information) entered from the sensor group 24 and a signal (information) entered from the wireless device 23. The control device 21 controls rotation speed of each of the motors 3 based on the signal entered from the sensor group 24, and thereby controlling the attitude (pitch angle, roll angle, yaw angle) and the movement (forward, backward, upward, downward, leftward, rightward) of the UAV 100. Further, the control device 21 may determine whether the UAV 100 has landed on the water or on the ground. When determining that the UAV 100 has landed on the water or on the ground, the control device 21 may transmit such information through the wireless device 23.

[Support Frame]

As shown in FIG. 2, the UAV 100 has a support frame 30. The support frame 30 has, for example, an upper frame portion 30U that supports the main body 20 and the battery 9, and a lower frame portion 30L that extends downward from the upper frame portion 30U. The upper frame portion 30U has two horizontal bars 31 (FIG. 1) that are separated in the left-right direction and extend in the horizontal direction. Crossbars extend between two horizontal bars 31, and the main body 20 and the battery 9 are attached to the crossbars.

As shown in FIG. 2, the lower frame portion 30L has legs 32 extending downward from the horizontal bar 31. The lower frame portion 30L has, for example, four legs 32 (see FIG. 1). The lower frame portion 30L has lower end bars 33 extending in the horizontal direction and connected to lower ends of the legs 32. The lower end of the lower frame portion 30L (i.e., the lower end bar 33) is located below the lower end of a package container 40 to be described later, supports the UAV 100 on the ground when the UAV 100 lands, and prevents contact between the package container 40 and the ground.

The structure of the support frame 30 is not limited to the example of the UAV 100. For example, the support frame 30 may have a plate-shaped support base to which the battery 9 and the main body 20 are attached, and the legs 32 may extend downward from the support base.

[Package Container]

Figure 4:
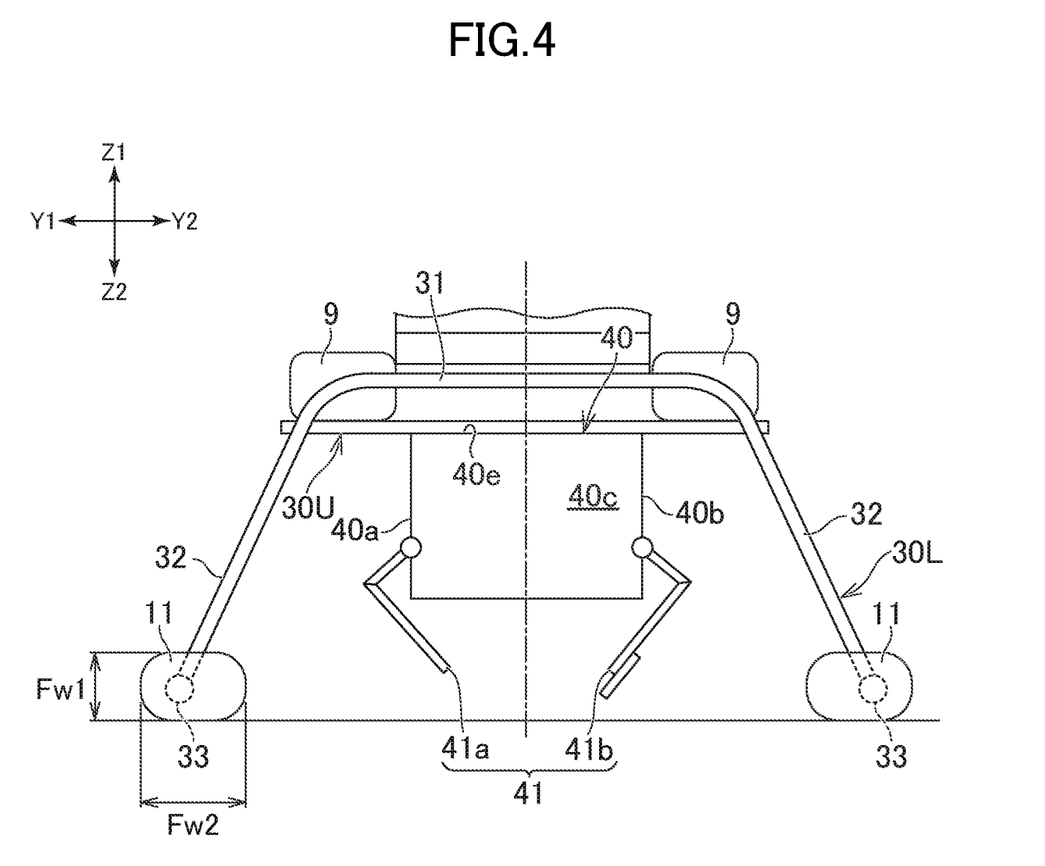
FIG. 4 is a side view of a package container with doors forming a bottom wall of the package container open.

The UAV 100 has the package container 40 (see FIG. 2) for storing a package G. The package container 40 is, for example, a rectangular parallelepiped, and as shown in FIG. 4, has a bottom wall 41, a front wall 40a, a rear wall 40b, a right side wall 40c, a left side wall, and an upper wall 40e. As shown in FIG. 4, for example, the bottom wall 41 is configured by openable and closable doors 41a and 41b. According to this structure, when the UAV 100 lands, the package G can be dropped by opening the doors 41a and 41b downward. The lower end of the support frame 30 (specifically, the lower end bar 33) is preferably located below the lower ends of the doors 41a and 41b in a state where the doors 41a and 41b of the package container 40 are opened downward.

The UAV 100 may include an actuator that opens and closes the doors 41a and 41b. When the UAV 100 lands, the control device 21 may operate the actuator to open the doors 41a and 41b. The positions of the doors 41a and 41b are not limited to the bottom wall 41. For example, the doors 41a and 41b may be provided on the front wall 40a, the side wall 40c, or the rear wall 40b.

The package container 40 is attached to the support frame 30. For example, the package container 40 is attached below the upper frame portion 30U. The package container 40 is located inside the legs 32. The main body 20 is located above the package container 40.

The package container 40 is liquid-tightly formed. That is, the package container 40 is configured such that external moisture does not enter the interior of the package container 40. When the doors 41a and 41b are closed, it is desirable that the entire package container 40 is liquid-tightly formed. For example, the front wall 40a, the rear wall 40b, the right side wall 40c, the left side wall, and the upper wall 40e are integrally formed of resin. As another example, when the front wall 40a, the rear wall 40b, the right side wall 40c, the left side wall 40d, and the upper wall 40e are plate materials such as metal, resin, and carbon, two adjacent walls are connected to each other to prevent ingress of moisture. Further, a packing (seal member) is provided at the edges of the two doors 41a and 41b in order to prevent moisture from entering through a gap between the two doors 41a and 41b. Further, packings (sealing members) are also provided at the edges of the doors 41a and 41b and the edges of the surrounding walls 40a, 40b, and 40c in order to prevent moisture from entering through the gaps between the edges.

The package container 40 is liquid-tightly formed, and thus, the buoyancy of the package container 40 can be obtained when the UAV 100 lands, as described later. The bottom wall 41 of the package container 40 does not necessarily to be sealed. In this case as well, if the package container 40 lands in a horizontal attitude, the air inside the package container 40 stays inside the package container 40. As such, it is possible to prevent water from entering the package container 40. As a result, the buoyancy of the package container 40 can be obtained.

[Float]

The UAV 100 has a float 11 for generating buoyancy when the UAV 100 lands on the water. The float 11 is a resin foam, or a bag or a box filled with gas, for example. Examples of the resin foam include foamed polystyrene and polyvinyl chloride foam (PVC foam).

The UAV 100 has floats 11 disposed apart from each other. As shown in FIG. 1, the UAV 100 has four floats 11. The four floats 11 are disposed so as to surround the main body 20 of the UAV 100 in a plan view. The number of the floats 11 may be one. In this case, the float 11 may be formed in an annular shape to surround the main body 20 of the UAV 100 in a plan view. The number of floats 11 may be five or more.

Each float 11 is desirably thin. That is, as shown in FIG. 4, it is desirable that a size Fw1 of a float 11 in the vertical direction is smaller than a size Fw2 in the front-rear direction and a size Fw3 (see FIG. 1) in the left-right direction. This structure can reduce air resistance due to the float 11 during flight.

The shape of the float 11 is not limited to the example of the UAV 100. For example, the float 11 may have a cylindrical shape. In yet another example, the float 11 may be an airbag. That is, when the control device 21 detects the landing of the UAV 100, the gas generator (inflator) may be ignited, and the float 11, which is an airbag, may be inflated by the gas generated by the gas generator.

[Buoyancy of Float and Buoyancy of Package Container]

As described above, the package container 40 is liquid-tightly formed. As such, the package container 40 generates buoyancy on and under water. When the UAV 100 is placed on the water, the water surface H1 (see FIG. 2) does not reach the height of the wireless device 23 built in the main body 20 due to the buoyancy of the float 11 and the buoyancy of the package container 40, corresponding to the volume of the package container 40. In other words, the size and the number of the floats 11, the volume of the package container 40, and the weight of the UAV 100 are determined so that the water surface H1 does not reach the height of the wireless device 23. Desirably, the size and the number of the floats 11, the volume of the package container 40, and the weight of the UAV 100 are determined so that the water surface H1 does not reach the height of the main body 20. In this description, "when the UAV 100 is placed on the water" means "when the UAV 100 having no package loaded in the package container 40 is placed on fresh water without waves."

In this way, even when the UAV 100 falls on the water surface, the wireless device 23 can operate, and thus, a user can reduce the risk of losing the UAV 100. For example, a position of the UAV 100 can be calculated based on a GPS signal received through the GPS receiver included in the wireless device 23. Then, a beacon transmitter included in the wireless device 23 can transmit a beacon including such position information. The user (the operator who monitors the flight of the UAV 100) can identify the position of the UAV 100 and collect the UAV 100 by using the beacon.

The buoyancy of the package container 40 is used in addition to the buoyancy of the float 11, which enables to downsize the float 11. This serves to reduce air resistance due to the float 11 during flight.

When the UAV 100 is placed on the water, preferably the water surface H1 does not reach the height of the lower surface 20b (see FIG. 2) of the housing 20a of the main body 20 due to the buoyancy of the float 11 and the buoyancy of the package container 40, corresponding to the volume of the package container 40. In this way, the user can more reliably collect the UAV 100. The housing 20a of the main body 20 or the electrical components in the housing 20a may be provided with a waterproof function.

The components constructing the main body 20 need not necessarily be housed in the common housing 20a. For example, the housing for accommodating the motor driving device 22 and the housing for housing the control device 21 and the wireless device 23 may be separate. Further, the housing for accommodating the control device 21 and the housing for housing the wireless device 23 may be separate. In this case, it is desirable that the water surface H1 does not reach the lower surface of the housing containing the electric components necessary for the user to collect the UAV 100, that is, the electric components necessary for specifying the position of the UAV 100. For example, it is desirable that the water surface does not reach the housing containing the wireless device 23 or the housing containing the wireless device 23 and the control device 21.

When the UAV 100 is placed on the water, the water surface H1 may not reach the height of any of the main body 20, the motor 3, and the battery 9 due to the buoyancy of the floats 11 and the buoyancy of the package container 40, corresponding to the volume of the package container 40. In other words, the size and the number of the floats 11, the volume of the package container 40, and the weight of the UAV 100 may be determined so that the water surface H1 does not reach the height of any of the main body 20, the motor 3, and the battery 9. This allows the user to use the UAV 100 again after collecting the UAV 100 from the water surface.

The maximum load capacity of the package container 40 may be specified. In this case, when the UAV 100 with the package of the maximum loading weight in the package container 40 is placed on the fresh water, the water surface H1 may not reach the height of the wireless device 23 due to the buoyancy of the floats 11 and the buoyancy according to the volume of the package container 40. In this case, the UAV 100 can be more reliably collected. When the UAV 100 with the package of the maximum loading weight in the package container 40 is placed on the fresh water, it is further desirable that the water surface H1 does not reach the height of the main body 20 due to the buoyancy of the floats 11 and the buoyancy according to the volume of the package container 40.

If the UAV 100 is placed on the water in a state where the buoyancy of the floats 11 acts but the buoyancy according to the volume of the package container 40 does not act, the water surface H1 may reach the height of at least one of the battery 9, the motor 3, and the main body 20. In other words, a small-sized float 11 may be used or the number of floats 11 may be limited to such an extent that the water surface H1 may reach the height of the at least one component. This serves to reduce air resistance due to the float 11 during flight. Here, "state in which the buoyancy according to the volume of the package container 40 does not act" is a state in which the water enters the package container 40 because the doors 41a and 41b are open, for example.

As shown in FIG. 2, in the UAV 100, the position of the battery 9 is the lowest among the battery 9, the motor 3, and the main body 20. As such, when the UAV 100 is placed on the water in a state where the buoyancy according to the volume of the package container 40 does not act, the water surface H1 reaches, for example, the height of the battery 9. The motor 3 is positioned horizontally with respect to the main body 20, and the lower surface of the main body 20 (the lower surface 20b of the housing 20a) is positioned lower than the lower end of the motor 3. When the UAV 100 is placed on the water in a state where the buoyancy according to the volume of the package container 40 does not act, the water surface H1 may reach the height of the lower surface of the main body 20 (the lower surface 20b of the housing 20a). The relationship between the heights of the battery 9, the motor 3, and the main body 20 is not limited to the example of the UAV 100. For example, the position of the main body 20 may be higher than the motor 3.

[Position of Float]

Figure 5:
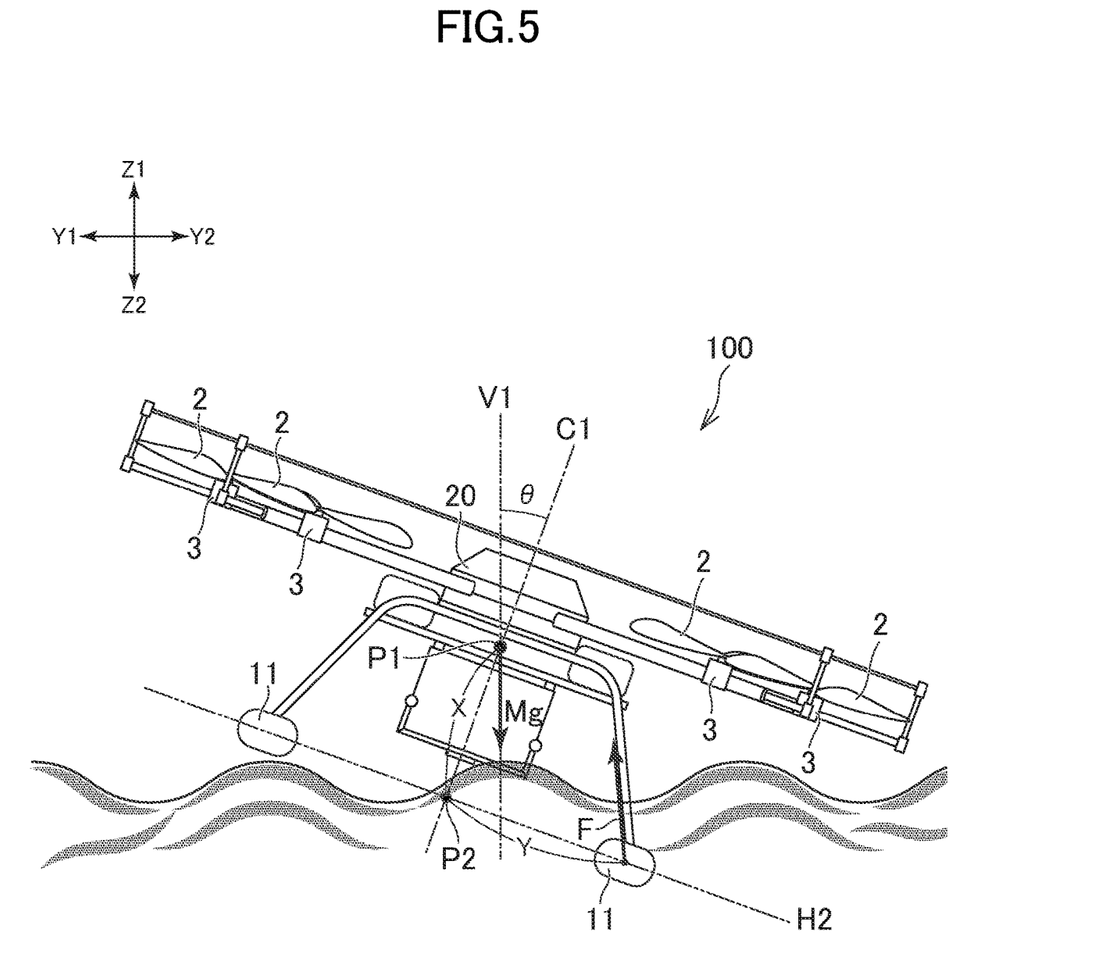
FIG. 5 is a schematic diagram showing a state where the UAV is inclined by receiving waves on the sea.

FIG. 5 is a schematic diagram showing a state where the UAV 100 is inclined by receiving waves on the sea. Here, the antenna 23a is omitted. The UAV 100 is inclined by an angle θ with respect to a straight line V1 along the vertical direction. In FIG. 5, a point P1 is the center of gravity of the UAV 100, and a point P2 is an intersection of a plane H2 passing through the center of the floats 11 and a center line C1 of the UAV 100.

When the UAV 100 is tilted by receiving the waves, if the following relational expression (1) is satisfied, the UAV 100 can return to the horizontal attitude.

$$X \times Mg \times \tan \theta e < Y \times F \quad (1)$$

The characters of the relational expression (1) are as follows:
X: Distance from the center of gravity P1 to the intersection P2
M: Mass of UAV
g: Gravity
θ: Inclination of the UAV 100 with respect to the vertical direction
Y: Distance from intersection P2 to float 11
F: Buoyancy of float 11

That is, if the moment due to the buoyancy F of the float 11 is larger than the moment due to the weight M of the UAV 100, the UAV 100 can return to the horizontal attitude without overturning. In order to satisfy the expression (1), it is desirable that the distance X from the center of gravity P1 to the intersection P2 is small and the distance Y from the intersection P2 to the float 11 is large. That is, it is desirable that the height of the float 11 is close to the height of the center of gravity P1, and that the horizontal distance Y from the center line C1 to the float 11 is large.

[Position of Float in Vertical Direction]

Figure 6:
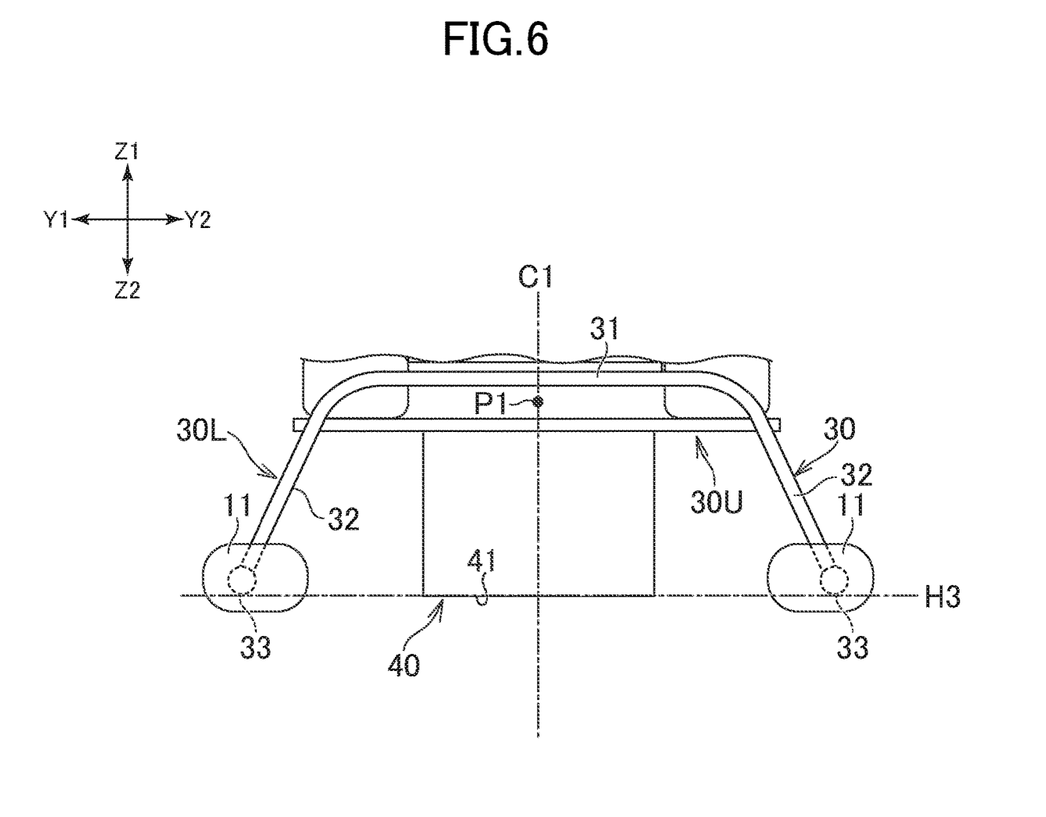
FIG. 6 is a side view showing a variation of a position of the float.

The position of the float 11 is lower than the height of the main body 20. In the example shown in FIG. 2, the entire float 11 is lower than the bottom surface (bottom wall 41) of the package container 40. Unlike the example of FIG. 2, the position of a part of the float 11 may be higher than the bottom surface (bottom wall 41) of the package container 40. For example, as shown in FIG. 6, the position of the float 11 may be determined so that the horizontal plane H3 including the bottom surface of the package container 40 and the float 11 intersect. In other words, the position of the upper part of the float 11 may be higher than the horizontal plane H3, while the position of the lower part of the float 11 may be lower than the horizontal plane H3. According to this arrangement of the float 11, the position of the float 11 becomes closer to the height of the center of gravity P1 as compared with the example of FIG. 2, for example. As a result, the attitude stability of the UAV 100 that has landed on the water can be improved.

As shown in FIGS. 2 and 6, the float 11 is attached to the support frame 30, for example. In the examples of FIGS. 2 and 6, the float 11 is attached to the lower end bar 33 and located at the lower end of the support frame 30. According to such arrangement of the float 11, when the UAV 100 lands, the float 11 touches the ground. As a result, the float 11 can function as a cushioning material for cushioning the collision between the UAV 100 and the ground. When the float 11 is used also as a cushioning material in this way, it is preferable that the material of the float 11 is a resin foam so as to secure the strength of the float 11 against the collision with the ground.

The position of the float 11 is not limited to the examples of FIGS. 2 and 6. For example, in a UAV 100A shown in FIG. 7, an entire float 11 is higher than the height of the bottom wall 41 (horizontal plane H3) of the package container 40. Floats 11 are located horizontally with respect to the package container 40. According to this arrangement of the floats 11, the height of the floats 11 becomes closer to the height of the center of gravity P1 of the UAV 100. As a result, the stability of the attitude of the UAV 100 can be further improved. As another example, the floats 11 may intersect with a horizontal plane H4 (see FIG. 7) passing an intermediate position between the upper end of the main body 20 and the lower end (bottom wall 41) of the package container 40. As yet another example, the floats 11 may intersect with a horizontal plane H5 (see FIG. 7) passing through the center of gravity P1 of the UAV 100.

Figure 7:
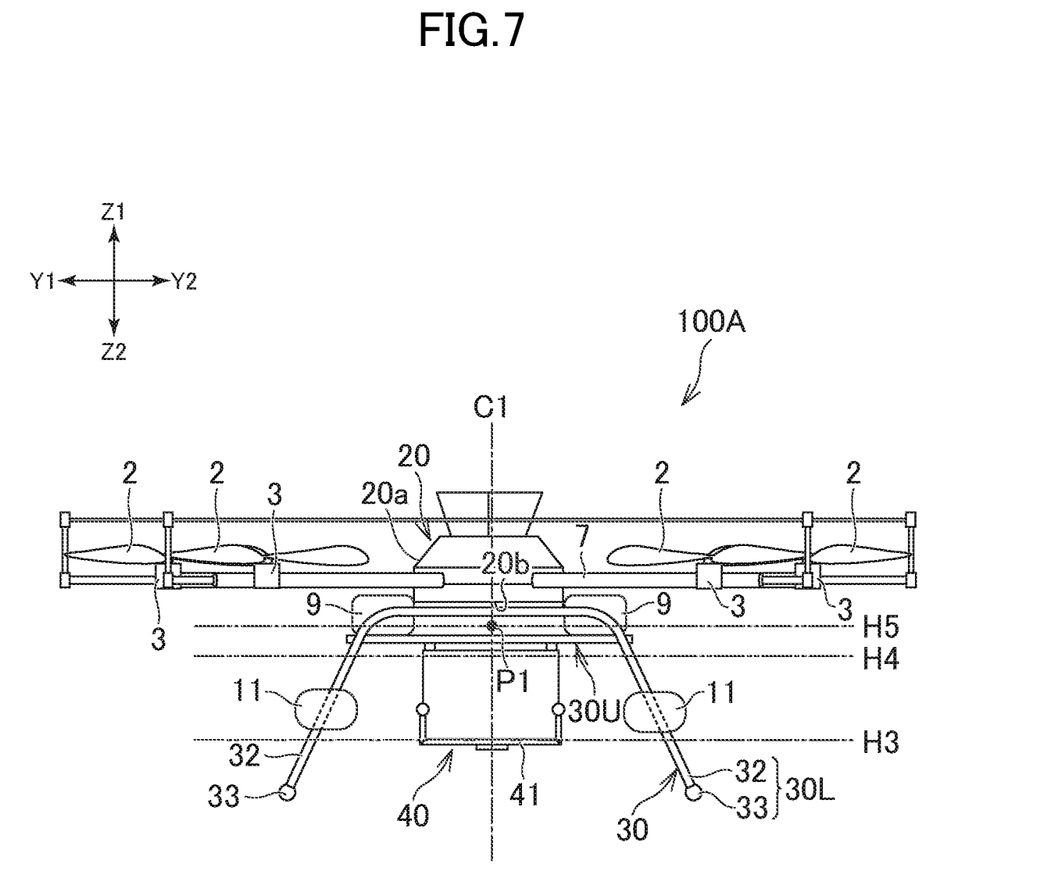
FIG. 7 is a diagram showing yet another variation of a position of the float.

In the UAV 100A shown in FIG. 7, the float 11 is attached at a position higher than the lower end (lower bar 33) of the support frame 30. For example, the float 11 is attached to a middle part of the leg 32 of the support frame 30. Meanwhile, the lower end (lower end bar 33) of the support frame 30 may be located below the horizontal plane H3 including the bottom surface (bottom wall 41) of the package container 40. According to this structure, the float 11 can be easily positioned close to the height of the center of gravity P1 of the UAV 100A. Further, when the UAV 100A lands on the ground, a sufficient distance can be secured between the ground and the package container 40.

[Position of Float in Horizontal Direction]

As shown in FIG. 1, the float 11 is horizontally separated from the main body 20 of the UAV 100 in a plan view. That is, the float 11 does not include a part that overlaps with the main body 20 of the UAV 100 in a plan view. Further, the distance L1 from the center line C1 of the UAV 100 to the center of the float 11 in a plan view is smaller than the distance L2 from the center line C1 of the UAV 100 to the center of the propeller 2 in a plan view. According to such arrangement of the float 11, it is possible to prevent the float 11 from affecting the air flow formed by the rotation of the propeller 2.

In the example shown in FIG. 1, the float 11 partially overlaps the trajectory of the rotating propeller 2 in a plan view of the UAV 100. Unlike the example shown in FIG. 1, the float 11 may not overlap the trajectory of the rotating propeller 2 in a plan view of the UAV 100.

In still another example, the float 11 may be located directly below the rotation center of the propeller 2 and the motor 3. That is, the float 11 and the motor 3 may overlap with each other in a plan view of the UAV 100. In this case, it is desirable that the float 11 has a shape that does not easily obstruct the airflow formed by the propeller 2. For example, the float 11 is preferably has a vertically elongated shape. Further, the diameter of the float 11 may gradually decrease downward. As another example, the distance L1 from the center line C1 of the UAV 100 to the float 11 in a plan view (see FIG. 1) may be larger than the distance L2 from the center line C1 to the center of the motor 3. In this case, the float 11 may be attached to a member different from the support frame 30.

Floats 11 are disposed around the center line C1 along the vertical direction. The floats 11 are disposed such that a distance between two adjacent floats 11 is the same, for example. In FIG. 1, reference numerals 11A, 11B, 11C, and 11D are written side by side on the floats 11. As shown in FIG. 1, the distance between the float 11A and the float 11B may be the same as the distance between the float 11A and the float 11D or the distance between the float 11C and the float 11D.

Figure 8:
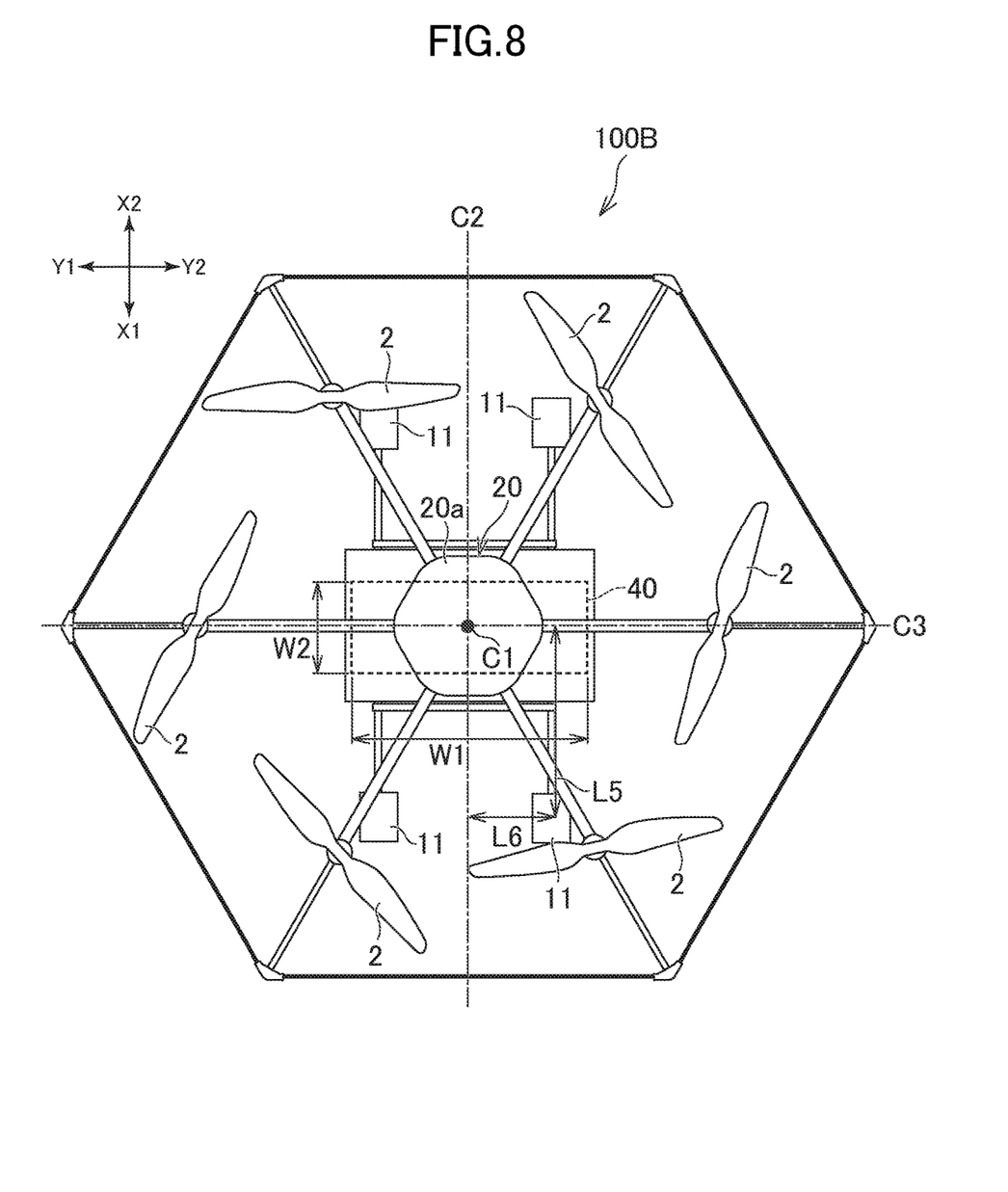
FIG. 8 is a diagram showing a variation of a position of the float and a shape of the package container.

On the other hand, the position of the float 11 may be determined in consideration of the shape of the package container 40. For example, in the UAV 100B shown in FIG. 8, the size W1 of the package container 40 in the front-rear direction is larger than the size W2 in the left-right direction. In this case, when the UAV 100 lands on the water, the moment due to the buoyancy of the package container 40 around the center line C2 along the left-right direction is greater than the moment due to the buoyancy of the package container 40 around the center line C3 along the front-rear direction. As such, the distance L5 from the center line C3 along the front-rear direction to the float 11 may be longer than the distance L6 from the center line C2 along the left-right direction to the float 11.

[Parachute]

Figure 9:
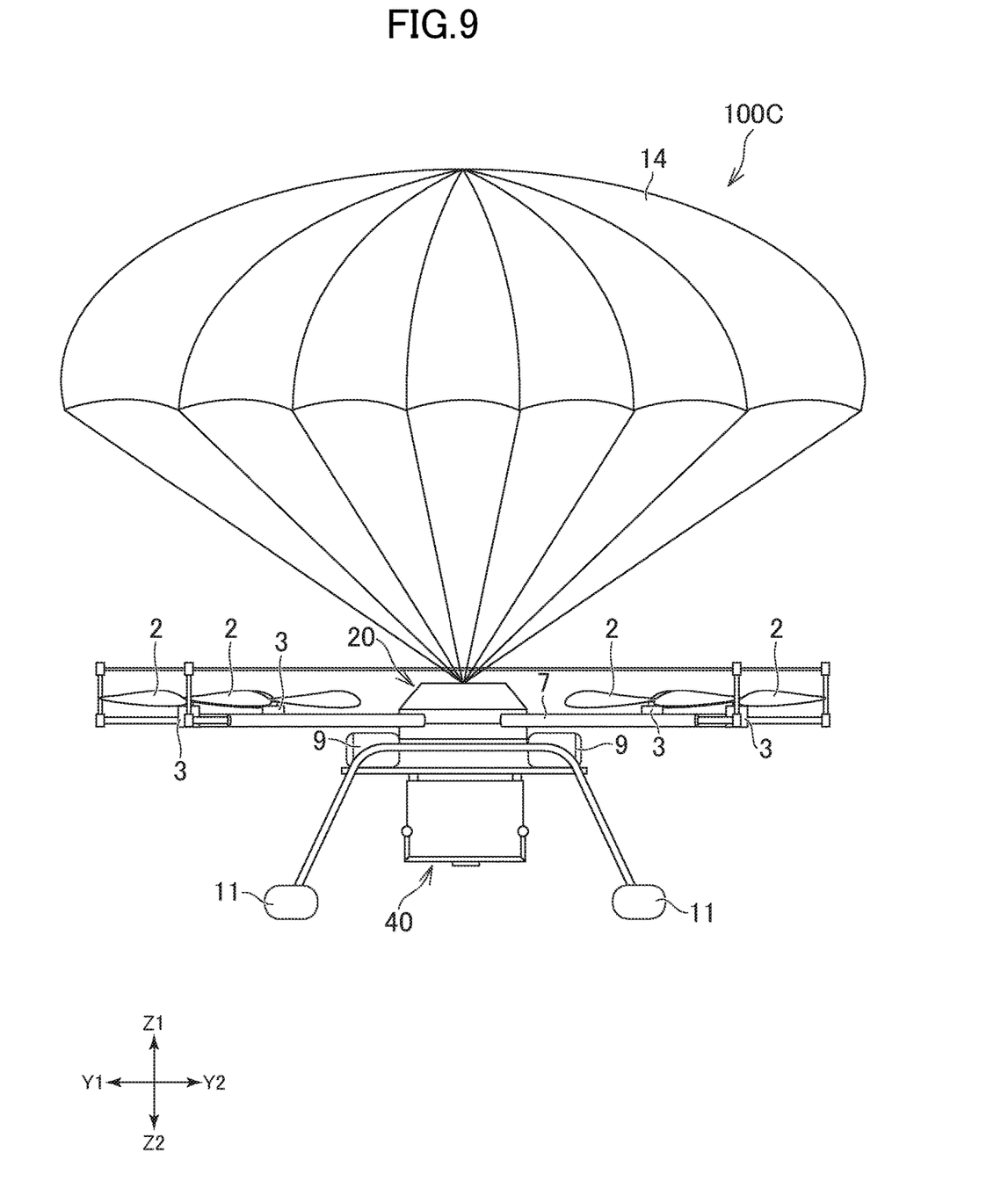
FIG. 9 is a diagram showing an example of a UAV having a parachute.

As shown in FIG. 9, the UAV 100C may further include a deployable parachute 14. With the use of the parachute 14, an impact when the UAV 100 collides with the ground or the water surface can be buffered, for example. Further, the attitude of the UAV 100 at the time of falling can be made closer to horizontal. As a result, even when the space between the bottom wall 41 of the package container 40 and the surrounding plate members (front wall 40a, rear wall 40b, right side wall 40c, left side wall) is not sealed, the air inside the container 40 stays inside the package container 40, and thus the package container 40 can function as a float. For example, when the UAV 100C that has completed the delivery of a package returns, if the package container 40 is open, the space between the bottom wall 41 and the surrounding plate member is not sealed. In this case as well, the use of the parachute 14 allows the UAV 100 to land on the ground or on the water in a horizontal attitude.

CONCLUSION

As described above, the UAVs 100, 100A, 100B, and 100C each include propellers 2, motors 3 that respectively drive the propellers 2, a control device 21 that controls the motors 3, and a main body 20 including a wireless device 23 that performs at least one of transmission and reception of signals, a package container 40 for storing a package, and a float 11. When the UAV 100 is placed on the water, the water surface does not reach at least the height of the wireless device 23 due to the buoyancy of the float 11 and the buoyancy according to the volume of the package container 40. According to this structure, it is possible to use the buoyancy of the package container 40 in addition to the buoyancy of the float 11. This can serve to downsize the float 11. As a result, air resistance due to the float 11 during flight can be reduced. Further, even when the UAVs 100, 100A, 100B, and 100C fall on the water surface, the wireless device 23 can operate, and thus a user can reduce the risk of losing the UAV 100.

The UAV proposed in the present disclosure is not limited to the example of the UAVs 100, 100A, 100B, and 100C described above, and may be appropriately changed. For example, the shape and the size of the package container 40, the number of the propellers 2, and the shape and the number of the floats 11 may be appropriately changed.

The invention claimed is:

1. An unmanned aerial vehicle (UAV) comprising:
propellers;
motors configured to drive the propellers, respectively;
a main body including a control device and a wireless device, the control device configured to control the motors, the wireless device configured to perform at least one of transmission or reception of a signal;
a package container for containing a package; and
a first float, wherein
in a case where the UAV is placed on water, buoyancy of the first float and the package container prevents a surface of the water from reaching at least a height of the wireless device, wherein the buoyancy of the package container depends on a volume of the package container;
wherein the package container is configured to hold a package to be collected or left at a location;
wherein, in a case where the UAV is placed on water, both the first float and the package container generate positive buoyancy.

2. The UAV according to claim 1, wherein
the package container includes a bottom wall forming a bottom surface of the package container and other walls forming other surfaces than the bottom surface, and
at least the other walls are formed to be liquid-tight.

3. The UAV according to claim 2, wherein the package container further includes at least two doors and a seal member;
wherein the seal member is provided between adjacent edges of the at least two doors;
wherein the seal member is configured to prevent moisture from entering through a gap between the adjacent edges.

4. The UAV according to claim 1, wherein
a position of at least a part of the first float is higher than a horizontal plane including the bottom surface of the package container.

5. The UAV according to claim 1, wherein
the first float intersects with a horizontal plane including a center of gravity of the UAV.

6. The UAV according to claim 1, wherein
the main body is surrounded by the propellers in a plan view of the UAV, and
the position of the first float is apart from the main body in a horizontal direction in a plan view of the UAV.

7. The UAV according to claim 1, wherein
a distance between a center of the UAV and the first float in a plan view is shorter than a distance between the center of the UAV and a center of the propellers in a plan view.

8. The UAV according to claim 1, further comprising a support frame that is in contact with a land to support the UAV when the UAV lands, wherein
the first float is attached to the support frame.

9. The UAV according to claim 8, wherein
the first float is located at a lower end of the support frame.

10. The UAV according to claim 8, wherein
the first float is located at a position higher than the lower end of the support frame.

11. The UAV according to claim 1, further comprising:
a second float, a third float and a fourth float;
wherein
a size of each of the floats, in a vertical direction, is smaller than a size of each of the floats in a front-rear direction and a size of each of the floats in a left-right direction.

12. The UAV according to claim 1, further comprising a deployable parachute.

13. The UAV according to claim 1, wherein the package container includes
a first door which hinges on a right side and is provided on a first side wall of the package container;
a second door which hinges on a left side and is provided on a second side wall of the package container; and
an actuator which is configured to open and close the first door and the second door.

14. The UAV according to claim 1, wherein the control device and the wireless device are located above the package container.

15. An unmanned aerial vehicle (UAV) comprising:
propellers;
motors configured to drive the propellers, respectively;
a main body including a control device and a wireless device, the control device configured to control the motors, the wireless device configured to perform at least one of transmission or reception of a signal;
a package container for containing a package; and
a first float,
wherein the UAV further comprises a battery configured to store power to be supplied to the motors, wherein;
when the UAV is placed on water in a state where the buoyancy of the first float acts while the buoyancy of the package container does not act because the package container is open, the water surface reaches a height of at least one of the battery, the motor, or the main body; and
wherein when the UAV is placed on water and when the buoyancy of the package container acts because the package container is closed, both the first float and the package container generate positive buoyancy which prevents the surface of the water from reaching the height of the at least one of the battery, the motor, or the main body,
wherein the buoyancy of the package container depends on a volume of the package container.

16. An unmanned aerial vehicle (UAV) comprising:
propellers;
motors configured to drive the propellers, respectively;
a main body including a control device and a wireless device, the control device configured to control the motors, the wireless device configured to perform at least one of transmission or reception of a signal;
a package container for containing a package; and
a first float, wherein
in a case where the UAV is placed on water, buoyancy of the first float and the package container prevents a surface of the water from reaching at least a height of the wireless device, wherein the buoyancy of the package container depends on a volume of the package container;

wherein the package container is configured to hold a package to be collected or left at a location;

wherein, in a case where the UAV is placed on water, both the first float and the package container independently generate positive buoyancy.

* * * * *